United States Patent
Christen

(10) Patent No.: US 10,906,367 B2
(45) Date of Patent: Feb. 2, 2021

(54) TIRE PRECONDITIONING FOR ELECTRIFIED VEHICLES

(71) Applicant: FORD GLOBAL TECHNOLOGIES, LLC, Dearborn, MI (US)

(72) Inventor: Erik J. Christen, Royal Oak, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 1150 days.

(21) Appl. No.: 14/744,471

(22) Filed: Jun. 19, 2015

(65) Prior Publication Data
US 2016/0368335 A1 Dec. 22, 2016

(51) Int. Cl.
- *B60L 1/02* (2006.01)
- *B60C 99/00* (2006.01)
- *H05B 1/02* (2006.01)

(52) U.S. Cl.
CPC ......... *B60C 99/003* (2013.01); *H05B 1/0236* (2013.01); *Y10S 903/91* (2013.01)

(58) Field of Classification Search
CPC ...... B60C 99/003; H05B 1/0236; H05B 3/00; H05B 3/02; H05B 3/06; H05B 3/08; H05B 3/12; H05B 3/14–148; H05B 3/16; H05B 3/18; H05B 3/40; H05B 3/54–58; Y10S 903/91
USPC ....... 219/202, 528, 205, 534, 542, 544, 545, 219/546, 547, 549
See application file for complete search history.

(56) References Cited

U.S. PATENT DOCUMENTS

| | | | |
|---|---|---|---|
| 3,945,277 A | 3/1976 | McGehee et al. | |
| 4,848,510 A * | 7/1989 | Ahmed | B60C 27/00 180/309 |
| 5,573,686 A * | 11/1996 | Lavicska | B62D 25/18 219/202 |
| 5,897,802 A * | 4/1999 | Jones | B62D 25/18 219/202 |
| 5,994,669 A * | 11/1999 | McCall | H05B 1/0236 219/202 |
| 6,350,963 B1 * | 2/2002 | Gray | B60C 9/20 152/151 |
| 6,896,047 B2 * | 5/2005 | Currle | B60H 1/247 165/203 |
| 2005/0035110 A1 * | 2/2005 | Petrenko | A63C 1/30 219/482 |
| 2005/0049344 A1 * | 3/2005 | Vasseur | B60C 1/0016 524/394 |
| 2006/0016793 A1 * | 1/2006 | Zhu | H01M 10/615 219/205 |
| 2012/0221196 A1 | 8/2012 | Seymour et al. | |
| 2012/0318783 A1 * | 12/2012 | Kamachi | H05B 1/0236 219/497 |

(Continued)

FOREIGN PATENT DOCUMENTS

| | | |
|---|---|---|
| CN | 102745024 A | 10/2012 |
| WO | 2010090240 A1 | 8/2010 |
| WO | 2010090241 A1 | 8/2010 |

*Primary Examiner* — Sang Y Paik
(74) *Attorney, Agent, or Firm* — David B. Kelley; Carlson, Gaskey & Olds

(57) ABSTRACT

An electrified vehicle according to an exemplary aspect of the present disclosure includes, among other things, a tire and an electrically powered heating device configured to selectively warm the tire. The heating device may be powered during on-plug conditions to precondition the tire.

20 Claims, 5 Drawing Sheets

(56) References Cited

U.S. PATENT DOCUMENTS

2015/0158366 A1\* 6/2015 Lee ..................... B60H 1/2218
701/36

\* cited by examiner

200~# TIRE PRECONDITIONING FOR ELECTRIFIED VEHICLES

TECHNICAL FIELD

This disclosure relates to a vehicle system and method associated with an electrified vehicle. The vehicle system is configured to precondition one or more tires of an electrified vehicle during on-plug conditions.

BACKGROUND

The need to reduce fuel consumption and emissions in vehicles is well known. Therefore, vehicles are being developed that reduce or completely eliminate reliance on internal combustion engines. Electrified vehicles are one type of vehicle being developed for this purpose. In general, electrified vehicles differ from conventional motor vehicles because they are selectively driven by one or more battery powered electric machines. Conventional motor vehicles, by contrast, rely exclusively on the internal combustion engine to drive the vehicle. Efforts have been made in the industry to continue to increase the fuel economy and electric range of electrified vehicles.

SUMMARY

An electrified vehicle according to an exemplary aspect of the present disclosure includes, among other things, a tire and an electrically powered heating device configured to selectively warm the tire.

In a further non-limiting embodiment of the foregoing electrified vehicle, the tire is a low rolling resistance tire.

In a further non-limiting embodiment of either of the foregoing electrified vehicles, the electrically powered heating device includes an air vent.

In a further non-limiting embodiment of any of the foregoing electrified vehicles, the electrically powered heating device includes an infrared heating device.

In a further non-limiting embodiment of any of the foregoing electrified vehicles, the electrically powered heating device includes a resistive heating device.

In a further non-limiting embodiment of any of the foregoing electrified vehicles, the resistive heating device is an air-PTC heater.

In a further non-limiting embodiment of any of the foregoing electrified vehicles, a control module is configured to command actuation of the electrically powered heating device using grid power from an external power source.

In a further non-limiting embodiment of any of the foregoing electrified vehicles, a fan is disposed adjacent to the electrically powered heating device.

In a further non-limiting embodiment of any of the foregoing electrified vehicles, a high voltage battery assembly is configured to selectively power the electrically powered heating device.

In a further non-limiting embodiment of any of the foregoing electrified vehicles, the electrically powered heating device is mounted within a wheel well of the electrified vehicle.

In a further non-limiting embodiment of any of the foregoing electrified vehicles, the electrically powered heating device is embedded within a chassis of the electrified vehicle.

In a further non-limiting embodiment of any of the foregoing electrified vehicles, the electrically powered heating device is mounted inside the tire.

A method according to another exemplary aspect of the present disclosure includes, among other things, powering a heating device during an on-plug condition of an electrified vehicle and warming at least one tire of the electrified vehicle with the heating device.

In a further non-limiting embodiment of the foregoing method, the method includes determining whether the electrified vehicle is on-plug prior to the powering step.

In a further non-limiting embodiment of either of the foregoing methods, the method includes determining whether a Key-On event is expected within a predefined threshold amount of time.

In a further non-limiting embodiment of any of the foregoing methods, the powering step includes powering the heating device using grid power.

In a further non-limiting embodiment of any of the foregoing methods, the warming step includes directing warm air onto the tire.

In a further non-limiting embodiment of any of the foregoing methods, the warming step includes electrically generating heat near the tire.

In a further non-limiting embodiment of any of the foregoing methods, the warming step is continued until the electrified vehicle is taken off-plug.

In a further non-limiting embodiment of any of the foregoing methods, the method includes warming the at least one tire during an off-plug condition by powering the heating device with a high voltage battery assembly.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure describes a vehicle system and method for preconditioning a tire of an electrified vehicle during on-plug conditions. The vehicle system may include a tire and one or more electrically powered heating devices configured to selectively warm the tire. The heating device is powered during on-plug conditions of the electrified vehicle and is configured to warm the tire by directing heat to the tire. Preconditioning the tires in this manner may improve the fuel economy and electric range of the electrified vehicle. These and other features are described in greater detail in the following paragraphs of this detailed description.

Figure 1:
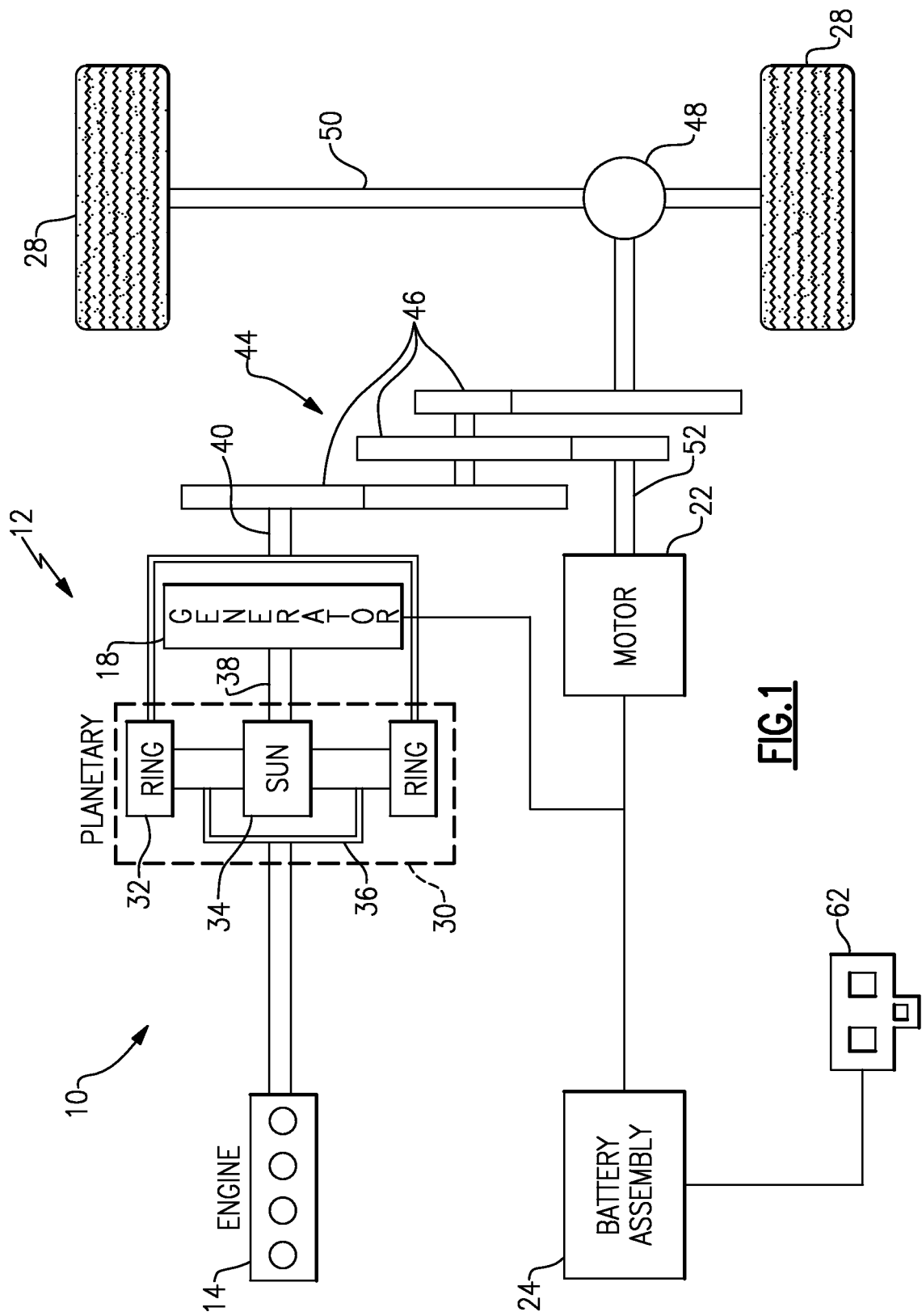
FIG. 1 schematically illustrates a powertrain of an electrified vehicle.

FIG. 1 schematically illustrates a powertrain 10 of an electrified vehicle 12. The electrified vehicle 12 of FIG. 1 is depicted as a plug-in hybrid electric vehicle (PHEV) in this embodiment; however, it should be understood that the concepts of this disclosure are not limited to PHEV's and could extend to other electrified vehicles, including, but not limited to, battery electric vehicles (BEV's).

In one non-limiting embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine) and a battery assembly 24. In this example, the second drive system is considered an electric drive system of the powertrain 10. The first and second drive systems generate torque to drive one or more sets of vehicle drive wheels 28 of the electrified vehicle 12.

The engine 14, which may be an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In one embodiment, the motor 22 cooperates as part of a regenerative braking system in which it can be employed to output torque. For example, the motor 22 can output electrical power to the battery assembly 24.

The battery assembly 24 is an example type of high voltage electrified vehicle battery assembly. The battery assembly 24 may include a high voltage battery pack that is capable of outputting electrical power to operate the motor 22 and the generator 18. Other types of energy storage devices and/or output devices can also be used to electrically power the electrified vehicle 12.

In a non-limiting PHEV embodiment of the electrified vehicle 12, the battery assembly 24 may be recharged or partially recharged using a charger module 60 that is connected to a charging station powered by an external power source, such as an electrical grid, a solar panel, or the like.

In one non-limiting embodiment, the electrified vehicle 12 has at least two basic operating modes. The electrified vehicle 12 may operate in an Electric Vehicle (EV) mode where the motor 22 is used (generally without assistance from the engine 14) for vehicle propulsion, thereby depleting the battery assembly 24 state of charge up to its maximum allowable discharging rate under certain driving patterns/cycles. The EV mode is an example of a charge depleting mode of operation for the electrified vehicle 12. During EV mode, the state of charge of the battery assembly 24 may increase in some circumstances, for example due to a period of regenerative braking. The engine 14 is generally not permitted to operate under a default EV mode but could be operated as necessary based on a vehicle system state or as permitted by the operator.

The electrified vehicle 12 may additionally be operated in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery assembly 24 at a constant or approximately constant level by increasing the engine 14 propulsion usage. The electrified vehicle 12 may be operated in other operating modes in addition to the EV and HEV modes.

Figure 2:
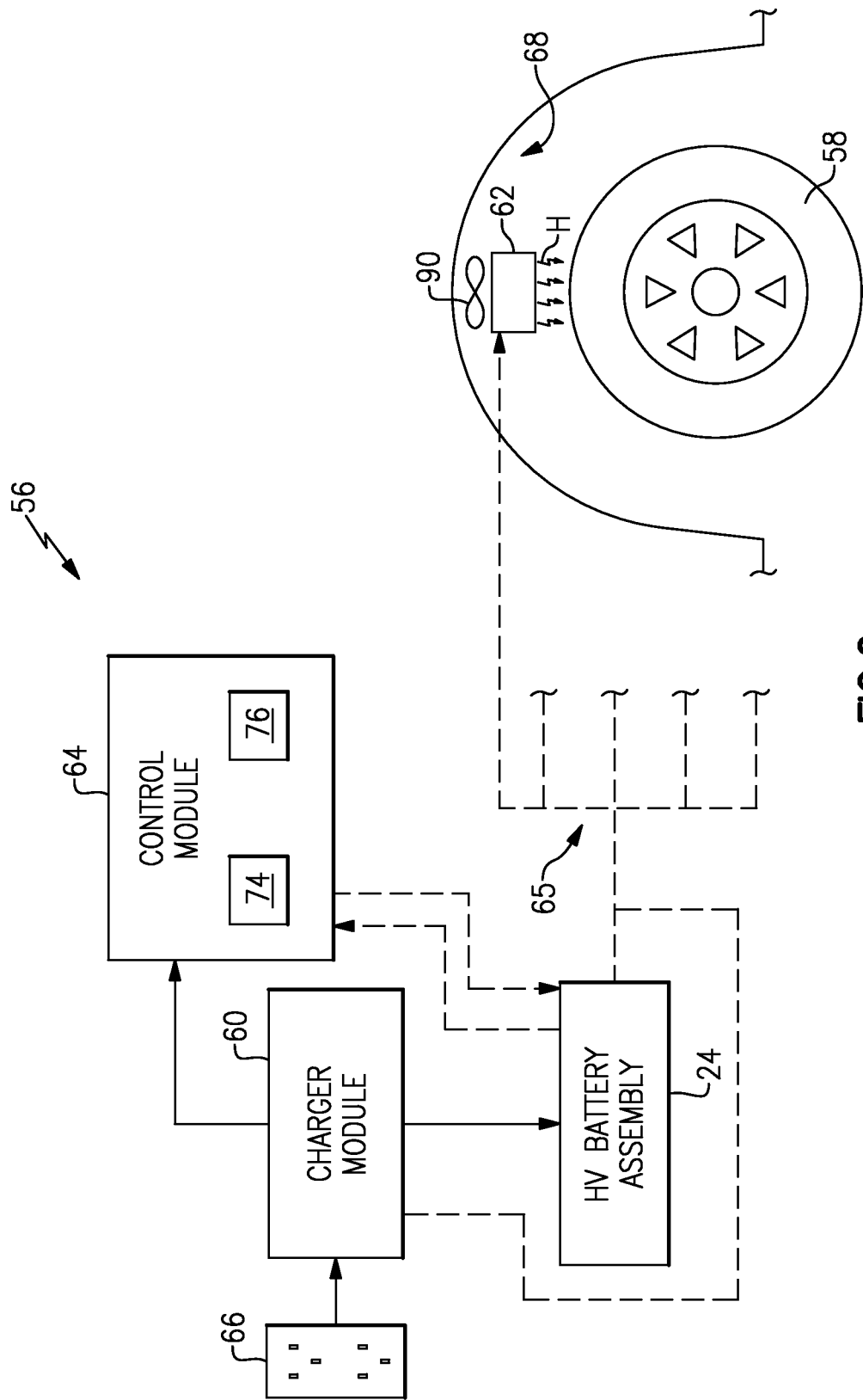
FIG. 2 illustrates a vehicle system of an electrified vehicle.

FIG. 2 is a highly schematic depiction of a vehicle system 56 that may be incorporated into a vehicle, such as the electrified vehicle 12 of FIG. 1. The vehicle system 56 is adapted to precondition one or more tires 58 of an electrified vehicle in order to warm the tire prior to beginning an upcoming drive cycle. Preconditioning the tires 58 may improve the fuel economy and electric range of the electrified vehicle.

In one non-limiting embodiment, the exemplary vehicle system 56 includes a high voltage battery assembly 24, one or more tires 58, a charger module 60, one or more heating devices 62 and a control module 64. The high voltage battery assembly 24 may include a plurality of battery cells or other energy storage devices. The battery cells of the high voltage battery assembly 24 store electrical energy that may be supplied, over a high voltage bus 65, to power various loads residing onboard an electrified vehicle. These loads may include various high voltage loads (e.g., electric machines, etc.) and/or various low voltage electrical loads (e.g., lighting systems, low voltage batteries, logic circuitry, etc.).

The charger module 60 is operably connected between the high voltage battery assembly 24 and an external power source 66. The charger module 60 is adapted to selectively supply the energy required to charge the battery cells of the high voltage battery assembly 24. In a non-limiting embodiment, the charger module 60 plugs into the external power source 66 and into a port located on the electrified vehicle to receive electrical power and deliver that power to the high voltage battery assembly 24 and/or directly onto the high voltage bus 65. The external power source 66 may include off-board power, such as utility/grid power.

In another non-limiting embodiment, the charger module 60 is configured to charge the high voltage battery assembly 24. If necessary, the charger module 60 may convert alternating current (AC) received from the external power source 66 to direct current (DC) for charging the high voltage battery assembly 24. In an alternative embodiment, a device separate from the vehicle system 56 is configured to perform any necessary AC to DC conversions. The charger module 60 is also configured to establish maximum available charging currents for charging the high voltage battery assembly 24, among other operational parameters.

The tire 58 may be mounted for rotation within a wheel well 68 of an electrified vehicle. Of course, although a single tire 58 is shown in FIG. 2, the electrified vehicle associated with the vehicle system 56 could include multiple tires (see, e.g., FIG. 3). In a non-limiting embodiment, the tire 58 is a low rolling resistance tire.

One or more heating devices 62 may be positioned relative to the tire 58. The heating device 62 is configured to precondition the tire 58, such as by warming it. In one non-limiting embodiment, the heating device 62 is an air vent configured to direct heat H, such as warm air from a passenger cabin of the electrified vehicle, onto the tire 58. A fan 90 may optionally be disposed adjacent to the heating device 62 to blow the warm air onto the tire 58. In another embodiment, the heating device 62 is an infrared heating device configured to generate heat H for warming the tire 58. In yet another non-limiting embodiment, the heating device 62 is a resistive heating device, such as an air-PTC heater or other resistive heating device, configured to generate heat H for warming the tire 58. Other heating devices are also contemplated within the scope of this disclosure.

In one non-limiting embodiment, the heating device 62 is powered by grid power when the vehicle is "on-plug" (i.e., plugged into the external power source 66). In another non-limiting embodiment, the heating device 62 may optionally be powered by the high voltage battery assembly 24 when the vehicle is "off-plug" (i.e., unplugged from the external power source 66). The electrical power for powering the heating device 62 may be communicated over the high voltage bus 65 either directly from the charger module 60 or from the high voltage battery assembly 24.

Figure 3:
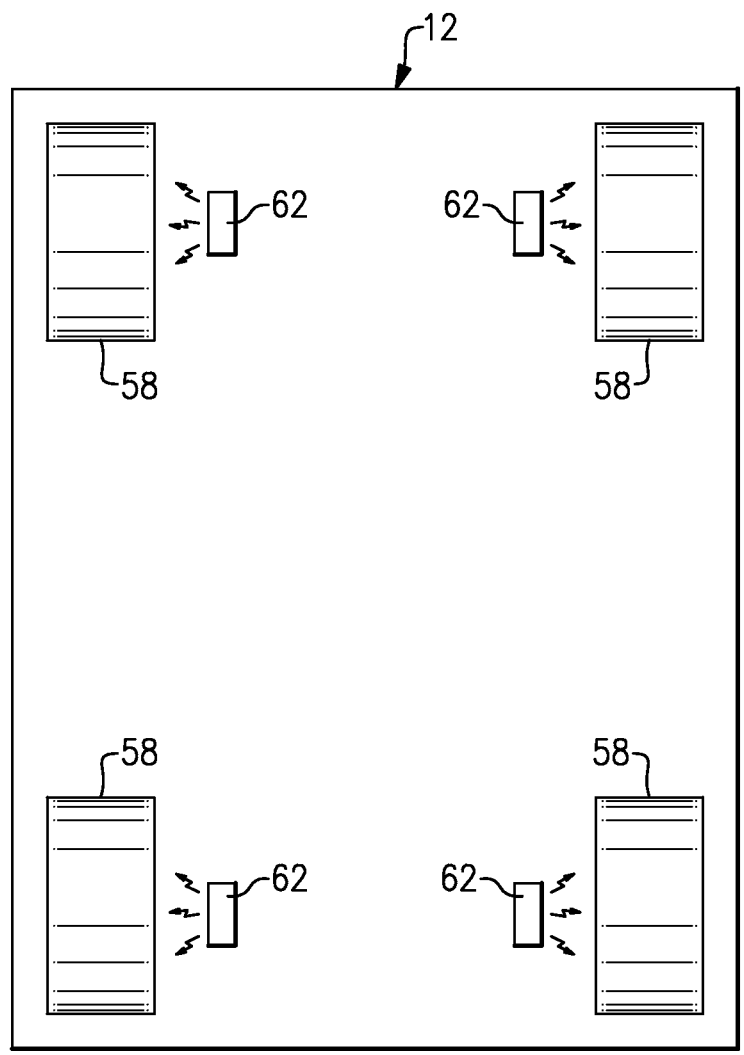
FIG. 3 illustrates an electrified vehicle equipped with multiple heating devices for warming the tires of the vehicle.

Referring to FIG. 3, an electrified vehicle 12 may be equipped with multiple tires 58. A heating device 62 may be positioned near one or more of the tires 58 for selectively preconditioning the tires 58. In a non-limiting embodiment, each tire 58 of the electrified vehicle 12 is warmed by at least one heating device 62. However, other configurations are also contemplated, including but not limited to, warming only the rear tires 58 of the electrified vehicle 12, warming only the front tires 58 of the electrified vehicle 12, etc.

The heating devices 62 could also be the same or different types of heating devices. In one non-limiting embodiment, a portion of the tires 58 may be heated by an infrared heating device, while another portion of the tires 58 may be heated by a resistance heating device. Various other heating device combinations are also contemplated within the scope of this disclosure.

Figure 4A:
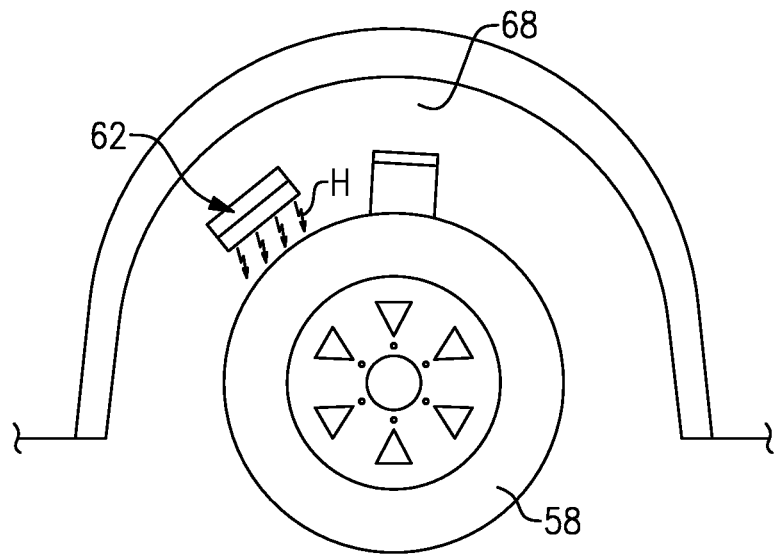
FIGS. 4A, 4B and 4C illustrate exemplary mounting locations for mounting heating devices configured to precondition tires of an electrified vehicle.
Figure 4B:
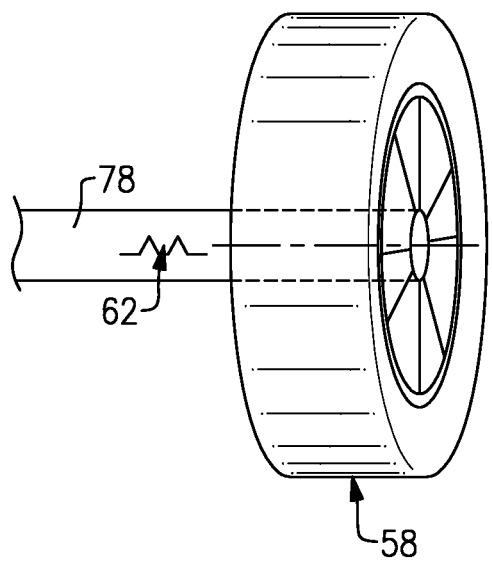
Figure 4C:
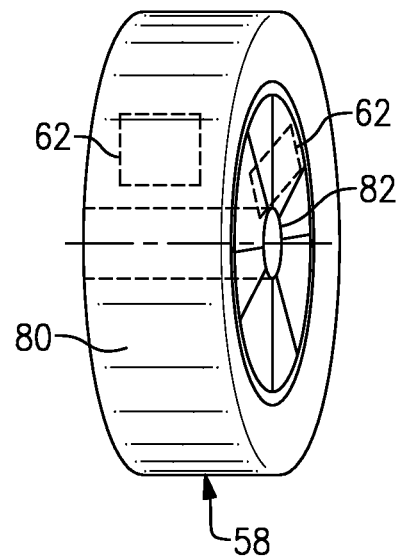

The heating device 62 may be mounted at various locations relative to the tire 58. For example, the heating device 62 could be mounted within the wheel well 68 (see FIGS. 2 and 4A). In another non-limiting embodiment, the heating device 62 is mounted within a chassis 78 of the electrified vehicle 12 (see FIG. 4B). In yet another non-limiting embodiment, the heating device 62 is embedded within the tire 58 (see FIG. 4C). For example, the heating device 62 could be embedded within the rubber portion 80 of the tire 58, within a hub portion 82 of the tire 58, or both.

Referring again to FIG. 2, the control module 64 may be part of an overall vehicle control unit, such as a vehicle system controller (VSC), or could alternatively be a stand-alone control unit separate from the VSC. In one non-limiting embodiment, the control module 64 includes executable instructions for interfacing with and commanding operation of the various components of the vehicle system 56 including, but not limited to, the high voltage battery assembly 24, the charger module 60 and the heating device 62. The control module 64 may include multiple inputs and outputs for interfacing with the various components of the vehicle system 56. The control module 64 may additionally include a processing unit 74 and non-transitory memory 76 for executing the various control strategies and modes of the vehicle system 56.

In one non-limiting embodiment, the control module 64 is configured to actuate the heating device 62 to heat the tire 58. The control module 64 may actuate the heating device 62 when the electrified vehicle is on-plug and an upcoming drive cycle is expected. In another embodiment, the control module 64 is configured to determine when to start and stop charging the high voltage battery assembly 24 and what charging rate should be used. In yet another embodiment, the control module 64 is configured to determine when to start and stop the preconditioning of the tire 58 using the heating device 62. These are but non-limiting examples of the many functions of the control module 64 of the vehicle system 56.

Figure 5:
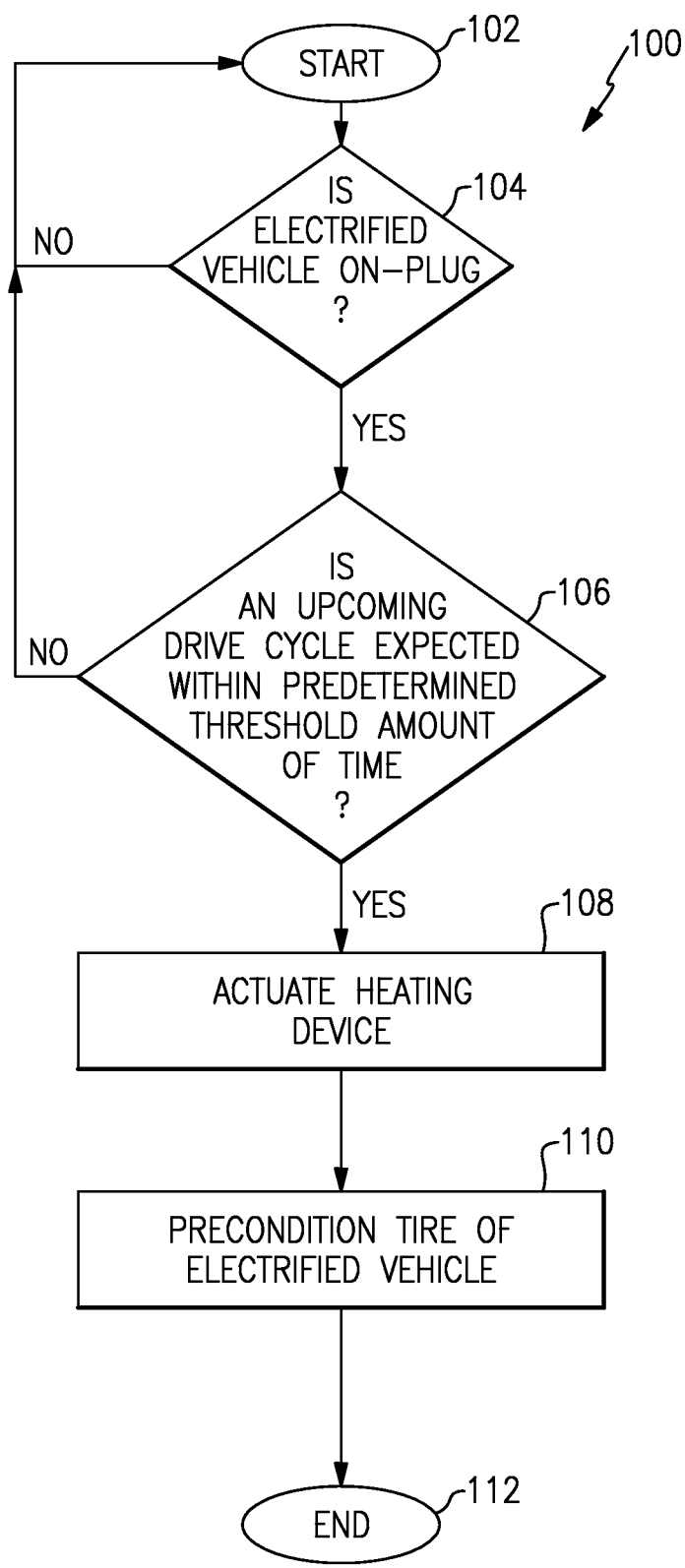
FIG. 5 schematically illustrates a control strategy for preconditioning a tire of an electrified vehicle during on-plug conditions.

FIG. 5, with continued reference to FIGS. 1-4C, schematically illustrates a control strategy 100 for controlling the vehicle system 56. For example, the control strategy 100 can be performed to precondition the tires 58 of the electrified vehicle 12 during vehicle on-plug conditions. The control module 64 can be programmed with one or more algorithms adapted to execute the control strategy 100, or any other control strategy. In one non-limiting embodiment, the control strategy 100 is stored as executable instructions in the non-transitory memory 76 of the control module 64.

As shown in FIG. 5, the control strategy 100 begins at block 102. At block 104, the control strategy 100 confirms whether or not the electrified vehicle 12 is on-plug. An on-plug condition of the electrified vehicle 12 exists when the electrified vehicle 12 is keyed OFF and the charger module 60 is plugged into both the electrified vehicle 12 and the external power source 66. If the electrified vehicle 12 is on-plug, the control strategy 100 may proceed to block 106.

Next, at block 106, the control strategy 100 determines whether an upcoming drive cycle is expected within a predefined threshold amount of time. In other words, tire preconditioning only occurs if it is expected that the owner operator of the electrified vehicle 12 will soon remove the vehicle from the charger module 60 and begin a drive cycle (i.e., a Key-On event is likely to occur). The start time of the tire preconditioning may be a function of multiple factors. In one non-limiting embodiment, the start time of the tire preconditioning may be based, at least in part, on customer input. In another non-limiting embodiment, the start time of the tire preconditioning may be based on the start time of a planned passenger cabin preconditioning. In yet another non-limiting embodiment, the start time of the tire preconditioning may be based on an established pattern of drive cycles associated with the electrified vehicle 12.

Logic for deriving the tire preconditioning start times may be programmed within the control module 64, such as within one or more look-up tables. By way of one non-limiting example, a first start time may be employed to begin preconditioning the tire 58 if the upcoming drive cycle is expected in 15 minutes or less, whereas a second, later start time may be employed if the upcoming drive cycle is expected in greater than 15 minutes. This is only intended as one non-limiting example, and the predefined threshold amount of time may be set at any amount of time.

If it is determined at block 106 that an upcoming drive cycle is expected within the predefined threshold amount of time, the control strategy 100 may proceed to block 108 by actuating the heating device 62 to either generate heat or direct heat toward the tire 58. The heating device 62 may be powered using electrical grid power communicated over the high voltage bus 65. In one non-limiting device, the heating device 62 includes an air vent that is actuated by opening the air vent to direct heat H onto the tire 58. The heat H may be warm air that is extracted from a preconditioned passenger cabin of the electrified vehicle 12. Grid power is used to precondition the passenger cabin. In another non-limiting embodiment, the heating device 62 includes an electrically powered heating device that is actuated to generate heat H that can be used to warm the tire 58.

Once the heating device 62 has been actuated at block 108, preconditioning of the tire 58 begins at block 110. Preconditioning, or warming, the tire 58 in this manner improves fuel economy by virtue of higher tire temperatures, higher tire pressures and warmer tire materials (e.g., viscoelastic properties). Improved EV range may also be achieved because less HV power is required to move the electrified vehicle at the Key-On event.

The tire 58 may be preconditioned until the electrified vehicle 12 is taken off-plug, at which point the control strategy 100 ends at block 112. If desired, the heating device 62 can also be actuated during a drive cycle to heat the tire 58, such as by using power from the high voltage battery assembly 24 or by bleeding warm air from the passenger cabin.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An electrified vehicle, comprising:
   a tire;
   an electrically powered heating device configured to selectively warm said tire; and
   a control module configured to command actuation of said electrically powered heating device if the electrified vehicle is on-plug and an upcoming drive cycle is expected within a predetermined threshold amount of time.

2. The electrified vehicle as recited in claim 1, wherein said tire is a low rolling resistance tire.

3. The electrified vehicle as recited in claim 1, wherein said electrically powered heating device includes an air vent.

4. The electrified vehicle as recited in claim 1, wherein said electrically powered heating device includes an infrared heating device.

5. The electrified vehicle as recited in claim 1, wherein said electrically powered heating device includes a resistive heating device.

6. The electrified vehicle as recited in claim 5, wherein said resistive heating device is an air-PTC heater.

7. The electrified vehicle as recited in claim 1, comprising a fan disposed adjacent to said electrically powered heating device.

8. The electrified vehicle as recited in claim 1, comprising a high voltage battery assembly configured to selectively power said electrically powered heating device.

9. The electrified vehicle as recited in claim 1, wherein said electrically powered heating device is mounted within a wheel well of the electrified vehicle.

10. The electrified vehicle as recited in claim 1, wherein said electrically powered heating device is embedded within a chassis of the electrified vehicle.

11. The electrified vehicle as recited in claim 1, wherein said electrically powered heating device is mounted inside said tire.

12. A method, comprising:
    powering a heating device during an on-plug condition of an electrified vehicle when an upcoming drive cycle is expected within a predetermined threshold amount of time; and
    warming at least one tire of the electrified vehicle with the heating device.

13. The method as recited in claim 12, comprising determining whether the electrified vehicle is on-plug prior to the powering step.

14. The method as recited in claim 12, comprising determining whether a Key-On event is expected within the predefined threshold amount of time.

15. The method as recited in claim 12, wherein the powering step includes powering the heating device using grid power.

16. The method as recited in claim 12, wherein the warming step includes directing warm air onto the tire.

17. The method as recited in claim 12, wherein the warming step includes electrically generating heat near the tire.

18. The method as recited in claim 12, wherein the warming step is continued until the electrified vehicle is taken off-plug.

19. The method as recited in claim 12, comprising warming the at least one tire during an off-plug condition by powering the heating device with a high voltage battery assembly.

20. A method, comprising:
    automatically warming a tire of an electrified vehicle with a heating device when an upcoming drive cycle is expected within a predetermined threshold amount of time, wherein the heating device is powered by grid power when the electrified vehicle is on-plug or is powered by a high voltage battery assembly when the electrified vehicle is off-plug.

* * * * *